United States Patent [19]

Tiearney, Jr. et al.

[11] Patent Number: 4,978,051

[45] Date of Patent: Dec. 18, 1990

[54] X-RAY TUBE TARGET

[75] Inventors: Thomas C. Tiearney, Jr.; William D. Love, both of Waukesha; David K. Moorman, New Berlin, all of Wis.

[73] Assignee: General Electric Co., Milwaukee, Wis.

[21] Appl. No.: 520,999

[22] Filed: May 7, 1990

Related U.S. Application Data

[60] Continuation of Ser. No. 432,406, Nov. 3, 1989, abandoned, which is a continuation of Ser. No. 193,604, May 13, 1988, abandoned, which is a division of Ser. No. 948,205, Dec. 31, 1986, Pat. No. 4,802,196.

[51] Int. Cl.$^5$ .......................... B23K 1/19; B23K 1/20; B23K 101/36; H01J 35/10
[52] U.S. Cl. .................................. 228/122; 228/124; 228/194; 228/263.12; 313/311
[58] Field of Search ................. 228/122, 124, 193–195, 228/208, 209, 211, 263.12, 263.19; 378/144; 313/311

[56] References Cited

U.S. PATENT DOCUMENTS

| | | | |
|---|---|---|---|
| 3,078,564 | 2/1963 | Bourdeau | 228/263.12 |
| 3,339,267 | 9/1967 | Bronnes et al. | 228/208 |
| 3,946,932 | 3/1976 | Peterson | 228/263.12 |
| 4,145,632 | 3/1979 | Devine, Jr. | 378/144 |
| 4,352,041 | 9/1982 | Hübner et al. | 378/144 |
| 4,459,264 | 7/1984 | Mizuhara | 228/263.12 |
| 4,645,121 | 2/1987 | Devine, Jr. | 228/122 |
| 4,700,882 | 10/1987 | Devine, Jr. | 228/194 |
| 4,762,269 | 8/1988 | Gyarmati et al. | 228/263.12 |
| 4,802,196 | 1/1989 | Tiearney Jr. et al. | 378/144 |

FOREIGN PATENT DOCUMENTS

| | | | |
|---|---|---|---|
| 2816249 | 10/1978 | Fed. Rep. of Germany | 228/124 |
| 3303568 | 8/1984 | Fed. Rep. of Germany | 228/124 |
| 1249498 | 3/1963 | France | 228/124 |

Primary Examiner—Sam Heinrich
Attorney, Agent, or Firm—Quarles & Brady

[57] ABSTRACT

A composite target for an x-ray tube has a graphite substrate portion and a metal portion, the two portions being bonded together by a platinum braze. A tantalum wetting agent layer on the graphite acts to improve the bond by causing the platinum to better wet the graphite portion.

16 Claims, 2 Drawing Sheets

X-RAY TUBE TARGET

This application is a continuation of application Ser. No. 07/432,406, filed Nov. 3, 1989, now abandoned, which is a continuation of application Ser. No. 193,604, filed May 13, 1988, now abandoned, which is a divisional of co-pending application Ser. No. 948,205 filed Dec. 31, 1986, now issued as U.S. Pat. No. 4,802,196.

BACKGROUND OF THE INVENTION

This invention relates generally to x-ray tube anode targets and, more particularly, to composite structures for x-ray tube rotating anode targets.

With increased demands being placed on the performance of x-ray tubes, manufactures have looked for ways to increase the efficiency and/or enhance the longevity of the x-ray tube target. One approach has been to substitute a graphite material for the conventional refractory metal, such as molybdenum, used in the target body. Graphite offers the advantages of both significantly higher heat storage capacity and lower density. The increased heat storage capacity allows for sustained operation at higher temperatures, whereas the lower density allows for the use of bigger targets with less mechanical stress on the bearing materials.

Along with the advantages of the graphite targets as discussed above, there are certain problems to overcome when one chooses that material over the commonly used refractory metal. First, it is more difficult to attach the graphite body to the rotatable stem of the x-ray tube than it is to attach a metal disc. Secondly, when a focal track is applied directly to a graphite substrate, the rate of heat transfer from the focal track to the substrate is slower than when the focal track is attached to a metal substrate. Under certain operating conditions, this can cause an overheating of the focal track and resultant damage to the target.

A known approach for obtaining the advantages of each of the commonly used materials, i.e., refractory metal and graphite, is to use a combination of the two in a so-called composite substrate structure. This structure is commonly characterized by the use of a refractory metal disc which is attached to the stem and which has affixed to its front side an annular focal track. Attached to its rear side, in concentric relationship to the stem, is a graphite disc which is, in effect, piggybacked to the refractory metal disc. Such a combination provides for (a) an easy attachment of the metal disc to the stem, (b) a satisfactory heat flow path from the focal track to the metal disc and then to the graphite disc, and (c) the increased heat storage capacity along with the low density characteristics of the graphite disc.

In the composite target structure, the metal portion is generally formed of a molybdenum alloy commonly known as TZM. While TMZ is the preferred material in this application, MT104 can be substituted for TZM. This alloy, in addition to molybdenum, contains about 0.5% titanium, 0.07% zirconium and 0.015% carbon. Other metals, including unalloyed molybdenum can and have been used.

With a composite target, one of the main concerns is that of attaching the graphite portion to the refractory metal portion in a satisfactory manner. In addition to the obvious strength requirements, which are substantial when considering rotational speeds of up to 10,000 RPM, relatively high operating temperatures on the order of 1,200° C. and resultant high thermal stresses must also be accommodated. In addition, the metal and graphite elements must be adequately joined so as to provide for the maximum transfer of heat from the metal portion to the graphite portion. For example, it has been found that if there are voids between the two portions, the heat transfer characteristics will be inadequate in those sections.

A common method for joining the graphite portion to the metal portion is that of furnace or induction brazing with use of an intermediate metal. Zirconium has been commonly used for that purpose because of its excellent flow and wetting characteristics. A problem that arises with use of zirconium, however, is the formation of carbides at the interface between the zirconium and the graphite. Since the carbides tend to embrittle the joint, the strength of a joint is inversely related to both the thickness of carbide formed and the continuity of the carbide layer. The amount of the carbide formed depends on the thermal history of the component during both the manufacturing and the operational phases thereof, neither of which can be adequately controlled so as to ensure that the undesirable carbides are not formed.

Other materials have been found useful in attaching the graphite portion to the metal portion of the target. A group of such materials that has been particularly suitable for such an attachment are those discussed in U.S. Pat. No. 4,145,632, issued on Mar. 20, 1979 and assigned to the assignee of the present invention. Those materials, and platinum in particular, were found to have a significant advantage over the zirconium material because of their relative insusceptibility to forming a carbide at the graphite platinum interface.

While the techniques and materials disclosed in U.S. Pat. No. 4,145,632 represented a substantial improvement in the art of bonding composite x-ray targets, it has been found that those techniques and materials will still produce a small percentage of unacceptable bonds. It is believed that some of these bond failures are caused at the interface between the braze material and the graphite. For example, voids are sometimes found in the area.

It is, therefore, an object of the present invention to provide an improved composite x-ray target with a brazed interconnection having good strength and heat transfer characteristics.

Another object of the present invention is to provide a method of brazing composite x-ray tube targets which minimizes voids in the brazed material and graphite interface and, thus, maximizes bond strength and heat transfer within the target.

These objects and other features and advantages will become more readily apparent upon reference to the following description when taken in conjunction with the appended drawings.

SUMMARY OF THE INVENTION

Briefly, in accordance with one aspect of the present invention, a relatively thin layer of a wetting agent, preferably tantalum, is applied to the formed graphite portion. A disc of platinum is then applied to the tantalum, and the refractory metal portion is placed over the platinum disc. The combination is thereafter heated to cause a brazing together of the materials. In this process, the platinum becomes the primary binding material, while the thin layer of tantalum functions as a wetting agent to ensure good contact between the platinum and the graphite.

The wetting agent's function is generally to improve the liquid platinum wetting of the graphite. It has been found that a tantalum wetting agent substantially reduces the wetting angle of platinum on graphite. This is indicative of greater contact between the platinum and the graphite.

According to various aspects of the invention, the tantalum can be physical vapor deposited, chemical vapor deposited, plasma sprayed, spray painted in the form of tantalum hydride or even silk screened in the form of a tantalum slurry. Generally, the tantalum should be in a layer with a thickness in the range of 2,000 to 10,000 angstroms and, preferably, the thickness should be from 2,500 to 5,000 angstroms. The layer should be thin enough that the platinum will not reach its solubility limit of tantalum during the braze, and the above-identified ranges will normally meet this requirement.

In the drawings as hereinafter described, a preferred embodiment is depicted. However, various other modifications and alternate constructions can be made thereto without departing from the true spirit and scope of the invention.

DESCRIPTION OF THE PREFERRED EMBODIMENT

Figure 1:
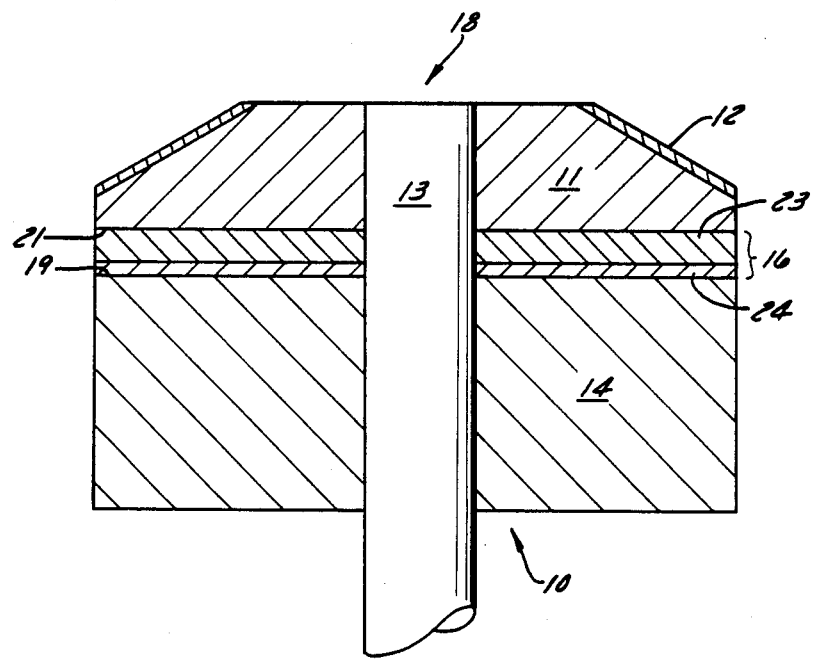
FIG. 1 is a sectional view of an x-ray torget made in accordance with the invention.

Referring now to FIG. 1, there is shown a target, or anode, for use in a rotating anode x-ray tube in accordance with the invention. The assembly, indicated generally at 10, includes a metal disc portion 11 having a focal track 12 applied to a forward face thereof for producing x-rays when bombarded by the electrons from a cathode in a conventional manner. The disc 11 is composed of a suitable refractory metal such as molybdenum or molybdenum alloy such as TZM or MT104. The conventional focal track 12 disposed thereon is composed of a tungsten or a tungsten/rhenium alloy material. The disc 11 is attached to a stem 13 by a conventional method, such as by brazing, diffusion bonding, or mechanical attachment.

Attached to a rear face of the metal disc 11 is a graphite disc portion 14, the attachment being made by platinum braze, indicated generally at 16, in a manner to be described hereinafter. The primary purpose of the graphite disc 14 is to provide a heat sink for the heat which is transferred through the metal disc 11 from the focal track 12. It is best if the heat-sink function can be provided without contributing significantly to the mass of the target assembly.

Figure 1A:
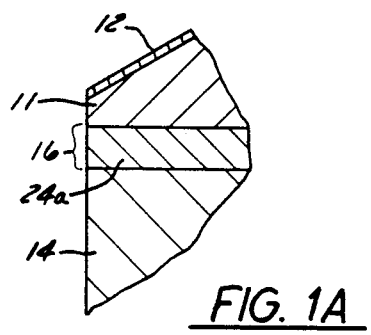
FIG. 1A is a partial sectional view of an x-ray target in accordance with the perferred embodiment of the invention.

Turning now to the braze 16, it is shown in FIG. 1 as consisting of two layers. The first layer 23 consists of pure platinum. What is meant by pure platinum is platinum without the wetting agent. In other words, no significant amount of wetting agent enters the layer 23 during the brazing process. The second layer 24 is composed of platinum and a wetting agent. The wetting agent is applied to the graphite portion 14 prior to brazing. The purpose of the wetting agent is to increase the liquid wetability of platinum on graphite. In practice, with the thicknesses specified below, the braze layer 16 will be approximately uniform in composition. This is shown in FIG. 1A which uses reference numerals similar to those used in FIG. 1, except that the braze layer 16 consists of a single layer 24a of platinum having nearly uniformly dissolved tantalum therein.

It is preferable that the wetting agent be soluble in platinum and have a low vapor pressure so that it will not contaminate the target focal track during the brazing process.

Experiments have shown that the wetting angle of platinum on graphite is between 70 and 90 degrees. Wetting angle refers to the angle formed between a molten material and a solid substrate. The closer to 90 degrees the wetting angle, the less well the molten material wets the substrate. When a molten material does not wet a substrate well, it is likely that, after the material has solidified, one will find voids at the interface. Conversely, the closer the wetting angle becomes to zero, the better the surface is wetted. Increased wetting decreases the likelihood of voids in the bond.

Experiments have shown that certain materials, including tantalum and molybdenum, when applied in thin layers to graphite, will reduce the wetting angle of platinum to under 10 degrees. Specific experiments have shown the wetting angle reduced to the range of 4 to 7 degrees. It is believed that tungsten, niobium and other materials will also work.

It is preferred that the wetting agent be applied to the graphite in a layer thin enough that the solubility limit of the wetting agent in platinum not be reached during the braze so that no intermetallic phase is formed. It is best, however, if the layer is thick enough to ensure complete coverage of all surface features on the graphite.

Tests have shown that what little carbide is formed prior to braze is generally dissolved in the platinum during the braze and thus is not a problem.

Generally, the wetting agent should be applied in a layer between 2,000 and 10,000 angstroms of thickness. Preferably, it should be applied in a layer between 2,500 and 5,000 angstroms in thickness.

Figure 2:
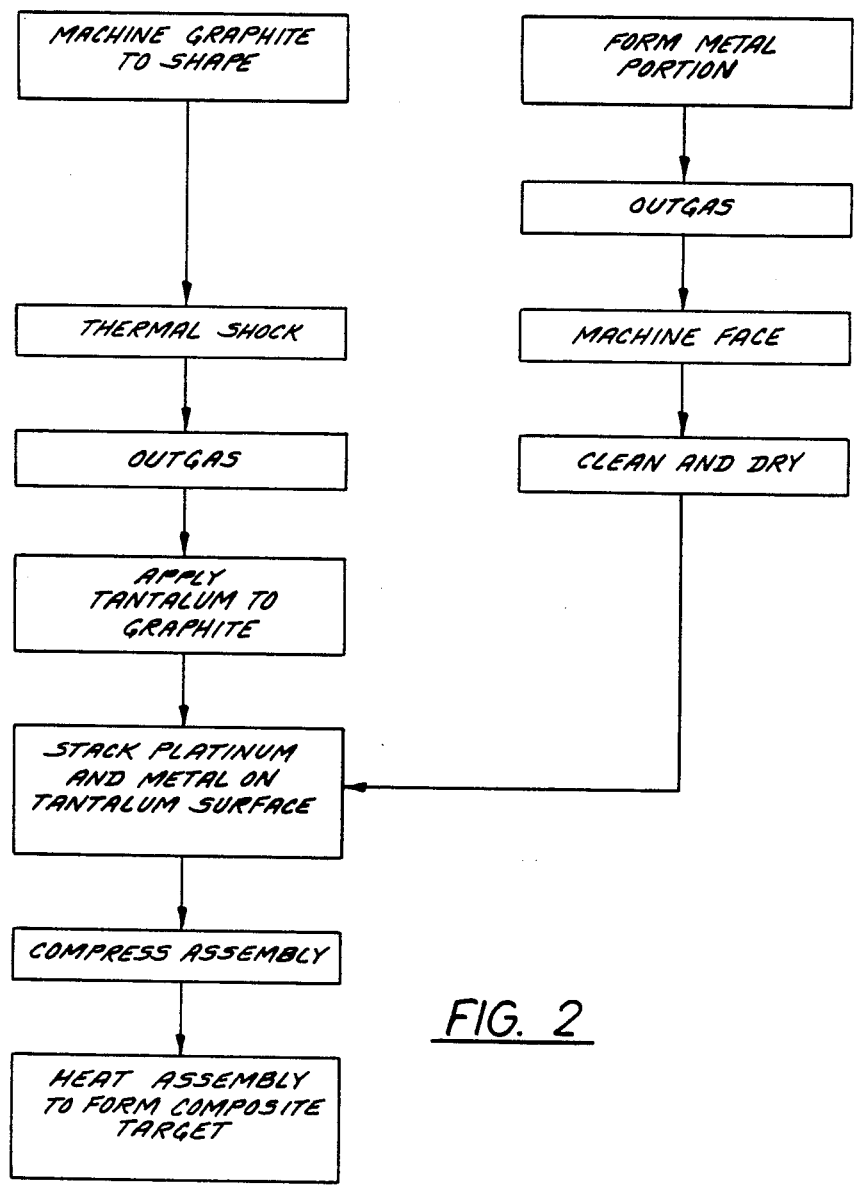
FIG. 2 is a flow diagram showing the process of target fabrication in accordance with the preferred embodiment of the invention.

A method for fabricating the target assembly is depicted in FIG. 2. For purposes of discussion, let us assume that the metal disc portion 11 and graphite disc portion 14 have been formed by conventional methods with either the disc portion 11 or each having a central bore 18 for receiving in close-fit relationship the stem 13 of the x-ray tube.

The graphite portion 14 is first cleaned, with particular care being given to the flat surface 19 to which the flat surface 21 of the metal portion 11 is to be attached. The surfaces of the graphite portion 14 are preferably treated by ultrasonic cleaning or other suitable surface treatment processes to prevent the release of graphite particles (dusting) during operation of the tube.

After the graphite 14 has been machined, it is processed further by thermal shocking. Thermal shock is performed by heating the graphite in air to a temperature of about 250° C. to 300° C. and then quickly submerging the heated graphite in de-ionized water at room temperature. After thermal shocking, the graphite is outgassed by heating to the elevated temperature of 1900° C. for about one hour in vacuum. The processed graphite is then ready for application of the wetting agent and brazing to a metal element.

The metal portion of the anode target is preferably formed of TZM or MT104. Some of the same steps applied to the graphite element are also applied to the TZM or MT104 metal element. In particular, the TZM is vacuum fired to 1900° C. for about one hour for outgassing. After outgassing, the TZM face which is to be attached to the graphite surface is finished machined to true up the flatness of the surface since outgassing at the elevated temperature may cause the metal to warp. After machining, the TZM metal element is cleaned, typically by using an ultrasonic methanol bath. If necessary, the surface to be bonded may also be shot peened. After drying from the ultrasonic cleaning, the TZM or MT104 metal element is then ready to be bonded to the graphite element.

A preferred method of preparing the graphite is Physical Vapor Deposition (PVD) of the tantalum onto the surface 19. Portions of the surface not to be coated with the tantalum can be masked in a conventional manner. The parameters for the PVD process are as follows:

Ion Current Density—3 to 4 watts per $cm^2$ is preferred, but 1 to 4 watts is acceptable.

The tantalum purity is preferred to be at least 99.95 percent.

The pressure in the CVD vessel is preferred to be between 3 and 10 microns of argon, but the range ½ to 20 microns of argon is acceptable.

The target voltage is preferred to be in the range of 2 to 2½ kv, but can be in the range of 1 to 3 kv.

While physical vapor deposition techniques are preferred, the wetting agent can also be applied using a silk-screen slurry technique, plasma spraying techniques, chemical vapor deposition or tantalum hydride can be spray painted on the graphite substrate.

After the wetting agent is applied, a composite assembly is formed by placing a washer or foil layer of platinum between the exposed wetting agent layer and the metal portion. Preferably, several assemblies, typically three or four, may be formed concurrently by stacking one on top of the other.

After stacking in this fashion, a weight, preferably about 16 pounds, is placed on top of the stacked assemblies, and the stacked structure is placed into a vacuum chamber furnace. The furnace is typically pulled to a vacuum of about $10^{-5}$ torr. The first step in the process is to heat the furnace to about 1800° C. and to hold that temperature for approximately five minutes to allow the platinum to melt. The furnace temperature is then allowed to cool in vacuum back down to approximately 450° C. At 450° C., the furnace is filled with argon gas to force a rapid cooling to about 100° C. At that point the furnace is opened to allow removal of the bonded anode target structures.

The preferred platinum layer is in a thickness of 250,000 to 750,000 angstroms and brazed at a temperature of 30° C. above the liquidus temperature of the braze material.

While this invention has been described with reference to particular embodiments and examples, other modifications and variations will occur to those skilled in the art in view of the above teachings. Accordingly, it should be understood that within the scope of the appended claims the invention may be practiced otherwise than is specifically described.

The invention claimed is:

1. A method of making a composite X-ray tube target comprising the steps of:
   applying a wetting agent comprising tantalum in a thickness in the range of 2,000 to 10,000 angstroms to a graphite substrate, said wetting agent having the ability to improve the liquid wetting of graphite by platinum;
   positioning a layer of platinum in the form of a washer or foil layer adjacent to said wetting agent;
   positioning a refractory metal target portion adjacent to said platinum; and
   heating the assembly for a time and to a temperature sufficient to braze the assembly together, and wherein said tantalum is dissolved substantially completely in said platinum during heating.

2. The method of claim 1 wherein said wetting agent is applied by physical vapor deposition techniques.

3. The method of claim 2 wherein said wetting agent is applied in a thickness in the range of 2,500 to 5,000 angstroms.

4. A method of making a composite X-ray tube target comprising the steps of:
   applying a wetting agent to a graphite substrate, said wetting agent having the ability to improve the liquid wetting of graphite by platinum;
   positioning a layer of platinum adjacent said wetting agent;
   positioning a refractory metal target portion adjacent said platinum; and
   heating the assembly for a time and to a temperature sufficient to braze the assembly together, and wherein said wetting agent is dissolved substantially completely in said platinum during heating.

5. The method of claim 4 wherein said wetting agent is soluble in platinum.

6. The method of claim 4 wherein said wetting agent produces a wetting angle of less than about 10 degrees in platinum on graphite.

7. The method of claim 4 wherein said wetting agent comprises a material chosen from the group consisting of tantalum, molybdenum, niobium and tungsten.

8. The method of claim 4 wherein said wetting agent is tantalum.

9. The method of claim 8 wherein said wetting agent is applied in a thickness in the range of 2,000 to 10,000 angstroms.

10. The method of claim 9 wherein said wetting agent is applied in a thickness in the range of 2,500 to 5,000 angstroms.

11. The method of claim 4 wherein said wetting agent is applied by physical vapor deposition techniques.

12. The method of claim 4 wherein said wetting agent is applied by plasma spray.

13. The method of claim 4 wherein said wetting agent is applied by silk-screen slurry.

14. The method of claim 4 wherein said wetting agent is applied by spray painting tantalum hydride.

15. The method of claim 4 wherein said wetting agent is applied in a layer thick enough to ensure complete coverage of all surface features on the graphite and to form a chemical bond thereto.

16. The method of claim 4 wherein said wetting agent is applied thein enough that said wetting agent does not precipitate out an intermetallic phase with said platinum during braze.

* * * * *

UNITED STATES PATENT AND TRADEMARK OFFICE
CERTIFICATE OF CORRECTION

PATENT NO. : 4,978,051

DATED : December 18, 1990

INVENTOR(S) : Thomas C. Tiearney, Jr., William D. Love and David K. Moorman

It is certified that error appears in the above-identified patent and that said Letters Patent is hereby corrected as shown below:

Column 1, Line 56    "TMZ" should read --TZM--

Column 2, Line 41    "the" should read --this--

Column 3, Line 26    "torget" should read --target--

Column 6, Line 63    "thein" should read --thin--

Signed and Sealed this

Twelfth Day of May, 1992

Attest:

DOUGLAS B. COMER

*Attesting Officer*    Acting Commissioner of Patents and Trademarks